United States Patent

Caudle et al.

[15] 3,651,868
[45] Mar. 28, 1972

[54] REMOVAL OF CALCIUM SULFATE DEPOSITS

[72] Inventors: Danny D. Caudle; Bobbie L. Carlberg, both of Ponca City, Okla.

[73] Assignee: Continental Oil Company, Ponca City, Okla.

[22] Filed: July 29, 1970

[21] Appl. No.: 59,335

[52] U.S. Cl..................................166/307, 166/312, 134/28, 134/29
[51] Int. Cl. ...............B08b 3/08, E21b 43/27, E21b 43/28
[58] Field of Search............................134/26, 28, 29, 30, 41; 166/311, 305 R, 312, 307, 271; 252/8.55 B

[56] References Cited

UNITED STATES PATENTS

| | | | |
|---|---|---|---|
| 656,466 | 8/1900 | Minor | 166/311 |
| 2,059,459 | 11/1936 | Hund et al. | 166/307 X |
| 2,124,530 | 7/1938 | Loomis et al. | 166/307 UX |
| 2,140,183 | 12/1938 | Bresler | 252/8.55 B |
| 2,386,605 | 10/1945 | Harton, Jr. et al. | 166/312 X |
| 2,787,326 | 4/1957 | Hughes | 166/312 X |
| 2,811,209 | 10/1957 | Elkins | 166/311 X |
| 2,964,109 | 12/1960 | Martin | 166/312 X |
| 3,067,070 | 12/1962 | Loucks | 134/30 UX |
| 3,170,815 | 2/1965 | White | 166/312 X |

*Primary Examiner*—Stephen J. Novosad
*Attorney*—Joseph C. Kotarski, Henry H. Huth, Robert B. Coleman, Jr., Gerald L. Floyd and Carroll Palmer

[57] ABSTRACT

A method of removing calcium sulfate deposits comprising contacting such deposits first with a pressurized solution of ammonia and carbon dioxide in water and next with water or an aqueous acid solution.

7 Claims, No Drawings

REMOVAL OF CALCIUM SULFATE DEPOSITS

BACKGROUND OF THE INVENTION

1. Field of the Invention

This invention relates to a process for the removal of calcium sulfate deposits from confined surfaces, particularly those deposits occurring in the borehole area of oil and gas wells and the production and fluid-gathering equipment associated therewith. It also relates to the removal of such deposits from the fluid-contacting surfaces of industrial equipment, such as boilers, cooling towers, tanks, conduits and such, wherein aqueous solutions are circulated and such deposits are formed.

2. Description of the Prior Art

When oil and gas wells are produced, often brine is produced concurrently. Sometimes brines from two or more locations in the strata mix in the vicinity of the borehole or in the borehole itself. If one brine has a high concentration of sulfate ions and another brine a high concentration of calcium ions, a solution is formed upon mixing which can be supersaturated with respect to calcium sulfate. Thus, calcium sulfate tends to come out of solution and form hard thick scale deposits on the formation rock or on any metal surface of the fluid-gathering system with which the solution comes in contact as it is produced from the well. Similarly, the solubility of calcium sulfate in a single or mixed brine can decrease due to a change in temperature or vaporization of water as the brine is produced. Calcium sulfate deposits as a crystalline mass which adheres tenaciously to the surface on which it is deposited, builds up and tends to plug flow channels, thus decreasing the production capability of the well. Similarly, calcium sulfate deposits can form from fluids injected into injection wells. In industrial equipment, calcium sulfate scale deposits forming on metal surfaces tend to undesirably reduce the heat transfer characteristics of the unit as well as cause plugging.

These calcium sulfate deposits may be in the form of anhydrite or gypsum, a hydrated calcium sulfate. Gypsum is generally formed at relatively low temperatures; whereas anhydrite is generally formed at relatively high temperatures.

Such scale deposits are especially difficult to remove, resisting dissolution in most common solvents for inorganic solids. Among the solvents previously tried are: a chilled fluid (water or brine) followed by an aqueous solution of sodium hydroxide, an aqueous solution of a mineral acid or mixture of citric acid and formic acid, aqueous solution of an alkaline metal salt (sodium carbonate, ammonium carbonate) followed by an aqueous acid solution, and an aqueous solution of ammonium carbonate or bicarbonate. Accordingly, it is an object of this invention to provide an improved method for removing calcium sulfate deposits from subterranean formations and surfaces of metal equipment through which aqueous fluids are circulated. It is a further object to provide a solvent system capable of dissolving a greater amount of calcium sulfate per unit volume than previous solvents. It is a still further object to dissolve calcium sulfate scale in a relatively short treatment time. Other objects, advantages and features of this invention will be apparent from the following description and claims.

SUMMARY OF THE INVENTION

The instant invention involves a process for removing calcium sulfate deposits from solid surfaces to which it is adhering, comprising:

a. mixing together anhydrous ammonia, carbon dioxide and water to form an aqueous solution of ammonium carbonate, ammonia and carbon dioxide, b. contacting the calcium sulfate-coated solid surface with this solution to convert the deposit to calcium carbonate and ammonium sulfate, and c. contacting the resulting surface with water or an aqueous acid solution to dissolve the calcium carbonate and ammonium sulfate.

DESCRIPTION OF THE PREFERRED EMBODIMENTS

As indicated above, some calcium sulfate scale can be removed by treating with an aqueous solution of ammonium carbonate followed by an aqueous acid solution. However, such treatment requires several alternate stages of the two treating solutions if the scale has any appreciable thickness and seldom removes all of the scale in a reasonable length of time. Ammonium carbonate is only moderately soluble in water, 100 parts by weight ammonium carbonate being soluble in 100 parts by weight water at 59° F. It has now been found that using a first treating composition containing water, ammonia and carbon dioxide under superatmospheric pressure followed by an aqueous acid second treating solution is remarkably more effective in removing calcium sulfate scale deposits as compared to similar previously used processes employing an aqueous ammonium carbonate solution as the first treating solution. In treating wells which already have water in either the borehole or surrounding formation in which the calcium sulfate scale is deposited, the first treating solution can be formed in situ by injecting ammonia and carbon dioxide into the well and into contact with such water. The ammonia and carbon dioxide can be injected either as a mixture or separately. The order of injection is immaterial.

The ammonia constituent of the first treating composition may be added either as anhydrous ammonia or aqua ammonia. Carbon dioxide may be added either in the solid or gaseous form. The ingredients of the first treating solution may be cooled before mixing and then allowed to warm to room temperature or higher to form the pressurized solution, or the ingredients may be combined while the system is under pressure.

The pressure of the first treating solution depends on the amounts of ammonia and carbon dioxide used therein. It is preferred to use from 3 to 15 parts by weight ammonia per 50 parts by weight water. Sufficient carbon dioxide should be added to maintain system pressure from 40 to 300 p.s.i.g. above normal pressure. From 12 to 70 parts by weight carbon dioxide is generally used. The system becomes more effective as $CO_2$ pressure is increased.

As the second treating solution, there may be used water or preferably an aqueous acid solution such as a mineral acid, for example hydrochloric acid or nitric acid or a carboxylic acid such as formic acid or citric acid.

In removing scale from a well or industrial equipment, the ambient temperature of the well or industrial equipment is generally satisfactory.

The reaction time depends greatly on the nature and thickness of the scale deposit. For the first treating solution, a contact time of from 12 to 24 hours is generally satisfactory. For the second treating solution, a contact time of from 1 to 3 hours can be used.

EXAMPLE 1

In a laboratory bomb apparatus, chilled initially to a temperature of −40° F. in an ice bath in order not to prematurely vaporize the reactants, were placed 25 ml. (approximately 15 grams) liquid ammonia, 30 grams solid carbon dioxide and 50 grams water to form a first treating composition. Into this first treating solution was placed a sample of gypsum removed from an oil well conduit. This sample was about 5/8 × 1 ½ × ⅛-inch to 3/16-inch and weighed 4.37 grams. The bomb was sealed, removed from the ice bath and allowed to heat to and remain at room temperature for 20 hours. Pressure in the bomb rose to about 300 pounds per square inch. The remaining sample was removed from the bomb and placed in 100 cc. of a second treating solution comprising 50 cc. 37 percent aqueous hydrochloric acid solution and 50 cc. water for 30 minutes. At the end of this time the sample had almost completely dissolved. The few small fragments remaining weighed less than 0.1 gram.

EXAMPLE 2

A sample of dense hard gypsum was removed from a conduit of a producing oil well where it had deposited. The sample was approximately cubical in shape and weighed 7.3 grams. The sample was placed in a bomb together with 50 ml. deionized water and 10 ml. (6 grams) anhydrous ammonia. The bomb was charged with 40 p.s.i. carbon dioxide for 24 hours. At the end of this time the sample was removed from the first treating solution and placed in 100 cc. of a second treating solution comprising 50 cc. 37 percent aqueous hydrochloric acid solution and 50 cc. water for 30 minutes. At the end of this test, 2.1 grams gypsum remained. Thus, 71 percent of the deposit had dissolved. A comparative test was made on another sample of the same gypsum deposit weighing 5.0 grams. A first treating solution consisting of 10 grams ammonium bicarbonate in 200 ml. deionized water was used. The second treating solution and other conditions were the same as that described above. At the end of this test, 2.4 grams gypsum remained. Thus, 48 percent of the deposit dissolved. These tests show that in the system described the use of a mixture of ammonia, water and carbon dioxide as the first treating solution results in far more gypsum being dissolved than when an aqueous solution of ammonium bicarbonate is used as the first treating solution.

Although certain preferred embodiments of the invention have been herein described in order to provide examples of sufficient clarity and detail to permit one skilled in the art to practice the invention, it is to be understood that various modifications and changes in the materials used and the conditions employed can be made without departure from the basic principles of the invention.

The invention having been described, what is claimed is:

1. A method of removing a calcium sulfate deposit from confined surfaces comprising:
   a. combining under pressure water, ammonia and carbon dioxide to form a first treating composition,
   b. contacting said confined surfaces with said pressurized first treating composition to convert said calcium sulfate deposit to calcium carbonate and ammonium sulfate,
   c. removing said first treating composition, and
   d. contacting said confined surfaces with a second treating composition consisting essentially of water or an aqueous acid solution to solubilize the calcium carbonate and ammonium sulfate.

2. The method of claim 1 wherein the second treating solution is an aqueous hydrochloric acid solution.

3. The method of claim 1 wherein the pressure of the first treating solution is from 40 to 300 p.s.i.g. above normal system pressure.

4. The method of claim 1 wherein the first treating solution contains from 3 to 15 parts by weight ammonia per 50 parts by weight water and sufficient carbon dioxide to raise the system pressure to from 40 to 300 p.s.i.g. above normal system pressure.

5. A method of increasing oil production by the removal of calcium sulfate scale from well conduits and the surrounding borehole area comprising:
   a. introducing into said well conduits and borehole area and into contact with said scale a first treating composition comprising a mixture of water, ammonia and carbon dioxide to convert said calcium sulfate scale to calcium carbonate and ammonium sulfate, and
   b. introducing into said borehole area through said well conduits and into contact with said scale a second treating composition comprising an aqueous acid solution to solubilize the calcium carbonate and ammonium sulfate.

6. The method of claim 4 wherein the pressure of the first treating solution is from 40 to 300 p.s.i.g. above normal system pressure.

7. A method of removing calcium sulfate scale from a subterranean water-containing formation comprising:
   a. injecting into said subterranean water-containing formation into contact with said calcium sulfate scale ammonia and carbon dioxide to convert said calcium sulfate scale to calcium carbonate and ammonium sulfate, and
   b. introducing into said borehole area through said well conduits and into contact with said scale a second treating composition comprising an aqueous acid solution to solubilize the calcium carbonate and ammonium sulfate.

* * * * *